United States Patent

Miura

[11] Patent Number: 6,154,925
[45] Date of Patent: Dec. 5, 2000

[54] TILTING HINGE

[75] Inventor: Fumiaki Miura, Kanagawa, Japan

[73] Assignee: Katoh Electrical Machinery Co., Ltd., Kanagawa, Japan

[21] Appl. No.: 09/231,721

[22] Filed: Jan. 15, 1999

[30] Foreign Application Priority Data

Jan. 27, 1998 [JP] Japan .................................. 10-014635

[51] Int. Cl.[7] .................................................. E05D 11/08
[52] U.S. Cl. ............................... 16/338; 16/340; 16/386; 403/111; 403/120
[58] Field of Search ............................ 16/337, 338, 339, 16/340, 273, 274, 386; 403/111, 103, 119, 120; 361/682, 681

[56] References Cited

U.S. PATENT DOCUMENTS

| | | | |
|---|---|---|---|
| 5,109,570 | 5/1992 | Okada et al. ............................. | 16/337 |
| 5,208,944 | 5/1993 | Lu ............................................ | 16/340 |
| 5,269,047 | 12/1993 | Lu ............................................ | 16/340 |
| 5,702,197 | 12/1997 | Chen ........................................ | 16/340 |
| 5,774,939 | 7/1998 | Lu ............................................ | 16/340 |
| 5,913,351 | 6/1999 | Miura ...................................... | 16/340 |

*Primary Examiner*—Chuck Y. Mah
*Attorney, Agent, or Firm*—Notaro & Michalos P.C.

[57] ABSTRACT

A tilting hinge, includes a bracket having mount plate portion and a bearing plate portion bent at a right angle in relation to the mount plate portion and in which a bearing hole is formed. A rotating shaft has a mount portion, a large-diameter portion and an externally threaded small-diameter portion supported rotatably in the bearing hole. A first friction washer is provided between the large-diameter portion and one side of the bearing plate of the bracket and has a hole in which the small-diameter portion of the rotating shaft is inserted. A second friction washer is provided in engagement with the other side of the bearing plate and has formed thereof a hole in which the small-diameter portion of the rotating shaft is inserted. A spring washer provided in engagement with the second friction plate and has formed thereof a hole in which the small-diameter portion of rotating shaft is inserted. A lock washer is provided in engagement with the spring washer and has formed thereof a hole in which the small-diameter portion of the rotating shaft is inserted. A locking nut screwed on the small-diameter portion of the rotating shaft presses the lock washer to the spring washer. A part of the small-diameter portion of the rotating shaft, is being tapered and formed to have a non-circular cross section and the hole in the lock washer is formed to have a noncircular shape corresponding to the noncircular tapered part of the small-diameter portion of the rotating shaft.

12 Claims, 7 Drawing Sheets

TILTING HINGE

BACKGROUND OF THE INVENTION

1. Field of the Invention

The present invention relates to a tilting hinge, and more particularly, to a tilting hinge especially suitable for use with an office automation (OA) apparatus such as wordprocessor, personal computer or similar of laptop battery-operated portable type and notebook-sized type including a covering panel display and an apparatus main body to connect the covering panel display openably and closably to the main body and support the covering panel display tiltably.

2. Description of the Prior Art

A typical one of well-known tilting hinges of this type comprises or a bracket consisting of a mount plate portion for fixation to a main body of an OA apparatus and a bearing plate portion bent at a right angle in relation to the mount plate portion and in which a bearing hole is formed; a rotating shaft consisting of a mount portion for fixation to a covering panel display of the OA apparatus, large-diameter portion and an externally threaded small-diameter portion supported rotatably in the bearing hole of the bearing plate portion, the mount portion, large- and small-diameter portions being contiguous axially of the rotating shaft; a first friction plate or washer provided between the large-diameter portion of the rotating shaft and one side of the bearing plate of the fixture and having formed in the center thereof a hole in which the small-diameter portion of the rotating shaft is inserted; a second friction plate provided in engagement with the other side of the bearing plate and having formed in the center thereof a hole in which the small-diameter portion of the rotating shaft is inserted; a spring washer provided in engagement with the second friction plate and having formed in the center thereof a hole in which the small-diameter portion of rotating shaft is inserted; a lock washer provided in engagement with the spring washer and having formed in the center thereof a hole in which the small-diameter portion of the rotating shaft is inserted; and a locking nut screwed on the external thread on the small-diameter portion of the rotating shaft to press the lock washer to the spring washer.

In this conventional tilting hinge, however, there is some clearance between the rotating shaft and the inner wall of the hole in the lock washer. Because of this clearance, the lock washer is caused to move somehow in the rotating direction of the rotating shaft or bearing plate portion rotated alternately forward or reversely as the covering panel display is opened and closed. Thus, the lock washer will be loosened when the covering panel display has been operated repeatedly for a long time, resulting in the initial friction torque being reduced so that the panel display cannot be held at a desired opened angle.

SUMMARY OF THE INVENTION

Accordingly, the present invention has an object to overcome the above-mentioned drawbacks of the prior art by providing a tilting hinge in which friction plates and spring washer are pressed to each other by the locking nut with the lock washer provided between the locking nut and spring washer, and adapted so that there is no rattling between the lock washer and rotating shaft.

The above object can be achieved by providing a tilting hinge comprising:

a bracket or fixture comprising a mount plate portion for fixation to a main body of an OA apparatus and a bearing plate portion bent at a right angle in relation to the mount plate portion and in which a bearing hole is formed;

a rotating shaft consisting of a mount portion for fixation to a covering panel display of the OA apparatus, large-diameter portion and an externally threaded small-diameter portion supported rotatably in the bearing hole of the bearing plate portion, the mount portion, large- and small-diameter portions being contiguous axially of the rotating shaft;

a first friction plate provided between the large-diameter portion of the rotating shaft and one side of the bearing plate or washer of the fixture and having formed in the center thereof a hole in which the small-diameter portion of the rotating shaft is inserted;

a second friction plate or washer provided in engagement with the other side of the bearing plate and having formed in the center thereof a hole in which the small-diameter portion of the rotating shaft is inserted;

a spring washer provided in engagement with the second friction plate and having formed in the center thereof a hole in which the small-diameter portion of rotating shaft is inserted; a lock washer provided in engagement with the spring washer and having formed in the center thereof a hole in which the small-diameter portion of the rotating shaft is inserted; and a locking nut screwed on the external thread on the small-diameter portion of the rotating shaft to press the lock washer to the spring washer;

a part of the small-diameter portion of the rotating shaft, along which it is inserted into the hole of the lock washer, being tapered and formed to have a noncircular cross section; and the hole in the lock washer being formed to have a noncircular cross-section shape corresponding to the noncircular tapered part of the small-diameter portion of the rotating shaft.

According to another aspect of the present invention, there may be provided a first friction washer on the large-diameter portion of the rotating shaft in engagement with the bearing plate of the fixture and a second friction washer on the external thread of the rotating shaft in engagement with the lock washer such that a friction torque takes place between the first friction washer and spring washer on the large-diameter portion of the rotating shaft as well as between the bearing plate and second friction washer on the external thread of the rotating shaft.

According to still another aspect of the present invention, only the first friction plate may be disposed in engagement with the large-diameter portion of the rotating shaft at one side of the baring plate of the fixture, the second friction washer, spring washer and lock washer be disposed in this order on the external thread of the small-diameter portion of the rotating shaft at the other side of the bearing plate of the fixture and the second friction washer be engaged on the bearing plate such that a friction torque takes place between the first friction washer and bearing plate and bearing plate on the large-diameter portion of the rotating shaft as well as between the second friction washer and spring washer.

According to yet another aspect of the present invention, a pair of a first spring washer and friction washer may be disposed at one side of the bearing plate of the fixture and another pair of a second spring washer and friction washer at the other side of the bearing plate, with each friction washer engaged on the bearing plate, such that a friction washer takes place between the first spring and friction washers in the first pair as well as between the second spring and friction washers in the second pair, respectively.

According to still yet another aspect of the present invention, grease traps may be formed in one or both of the first and second friction washers.

According to further aspect of the present invention, the tapered non-circular part of the small-diameter portion of the rotating shaft may be formed to have a circular cross section, a generally D-like cross section obtainable by cutting one side of that portion, or a generally elliptic cross section obtainable by axially cutting both sides of that portion.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The tilting hinge according to the present invention will be described herebelow concerning an application thereof to a notebook-sized type personal computer including a covering panel display and a main body to connect the covering panel display openably and closably to the main body and support the covering panel display tiltably. However, the present invention may further be applied otherwise, for example, to a notebook-sized type wordprocessor, portable telephone, laptop battery-operated portable type personal computer and wordprocessor, etc. each having a covering or lid panel or panel display and main body to connect the panel or panel display to the main body openably and closably and support it tiltably.

Figure 1:
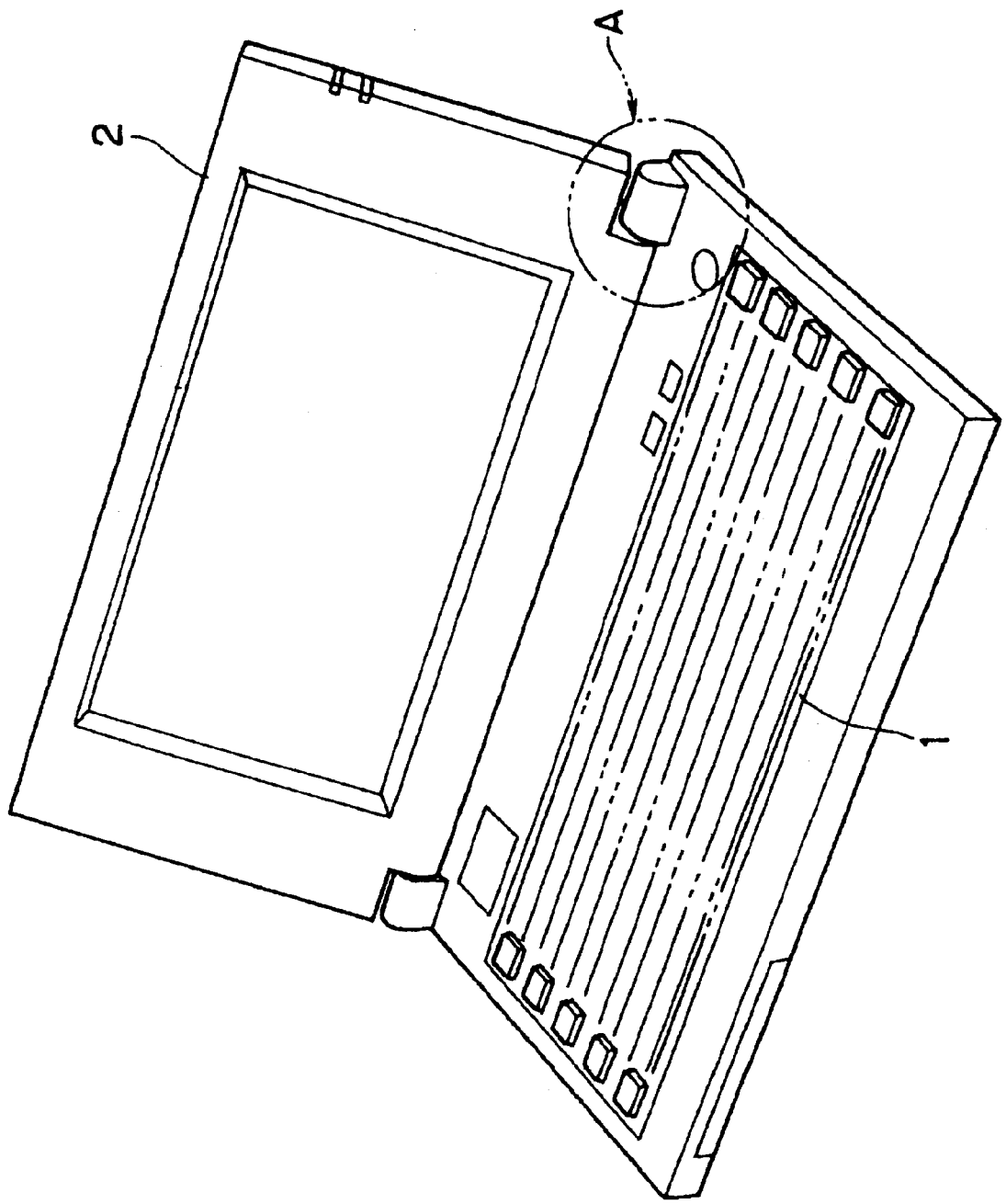
FIG. 1 is a perspective view of a notebook-sized personal computer using the tilting hinge according to the present invention.

Referring now to FIG. 1, there is illustrated a notebook-sized personal computer using the tilting hinge according to the present invention. The personal computer includes a keyboard or main body 1 and a panel display 2 connected openably and closably to the rear of the main body 1 with the tilting hinge generally indicated with a reference A.

Figure 2:
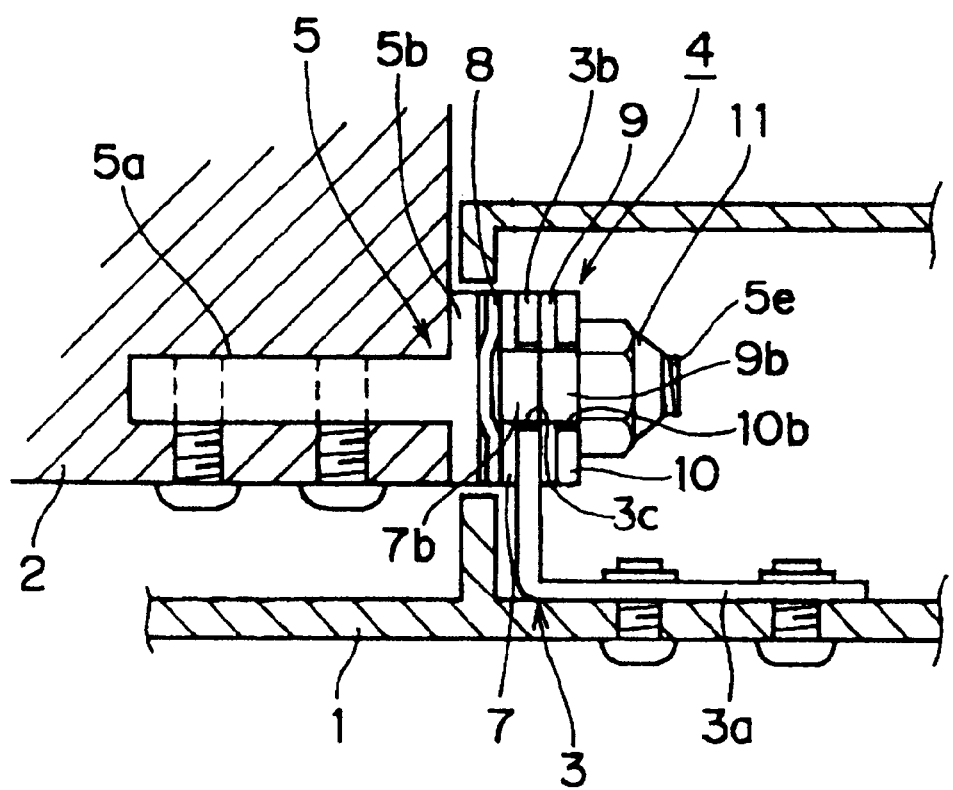
FIG. 2 is a partially sectional front view of a first embodiment of the tilting hinge according to the present invention.
Figure 3:
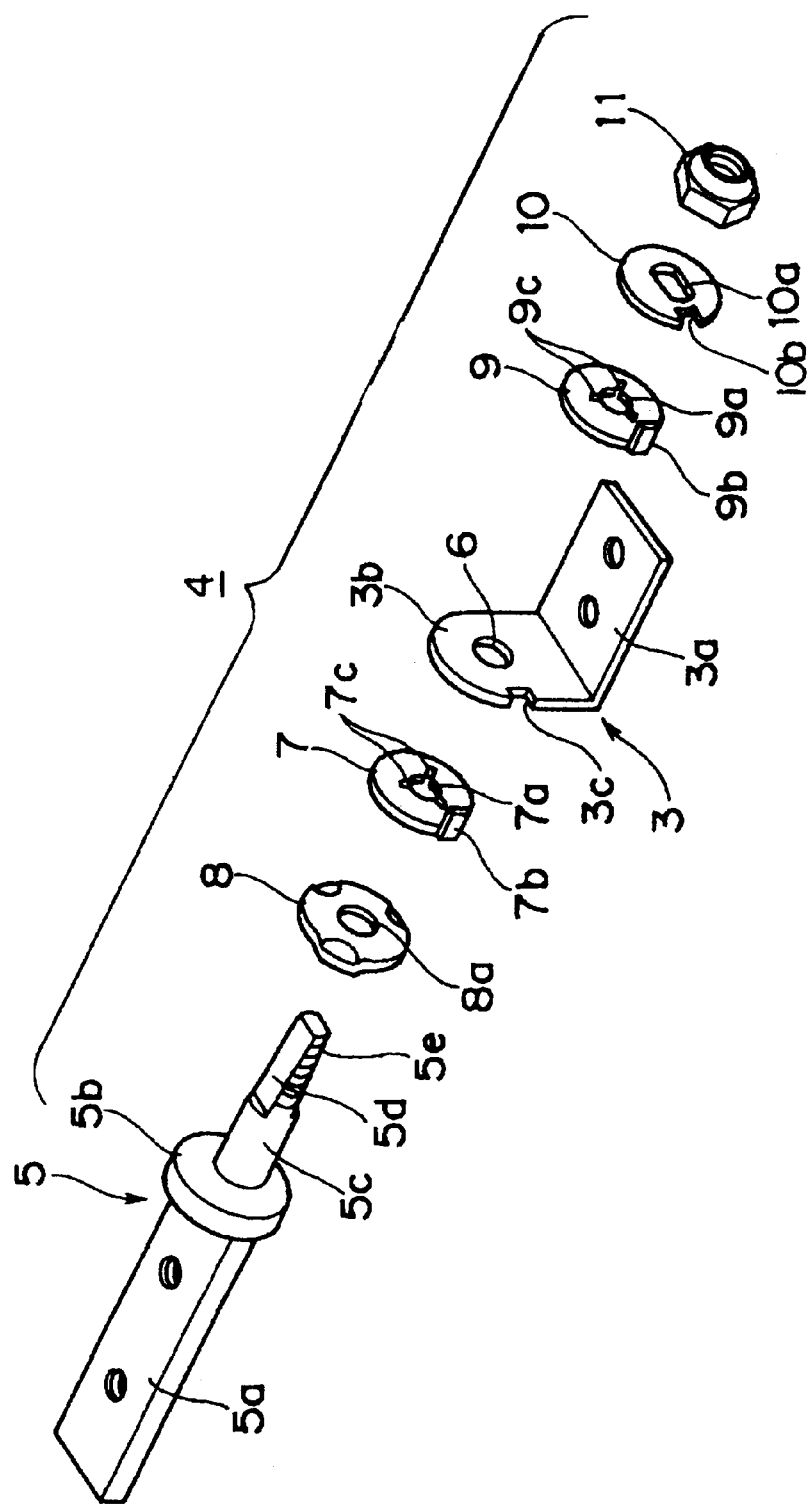
FIG. 3 is an exploded perspective view of the tilting hinge in FIG. 2.

FIG. 2 is a partially sectional front view of the first embodiment of the tilting hinge according to the present invention, showing the tilting hinge used in place, and FIG. 3 is an exploded perspective view of the tilting hinge in FIG. 2.

As best seen from FIG. 3, the first embodiment of the tilting hinge according to the present invention essentially comprises a friction mechanism 4 including a bracket or fixture 3, rotating shaft 5, first friction washer 7, spring washer 8, second friction washer 9, lock washer 10 and a locking nut 11.

The bracket or fixture 3 consists of a mount plate portion 3a and a bearing plate portion 3b bent at a right angle in relation to the mount plate portion 3a. The mount plate portion 3a is fixed to the main body 1 of the personal computer with screws. The bearing plate portion 3b has formed therein a hole 6 in which the rotating shaft 5 is supported rotatably. The rotating shaft 5 has a mount plate portion 5a which is fixed to the bottom end of the panel display 2. When the panel display 2 is opened or closed, the rotating shaft 5 is rotated correspondingly. At this time, the friction mechanism 4 will create a friction torque which allows to hold the panel display 2 at a desired opened angle. Of course, the rotating shaft 5 may be fixed to the main body 1 and the fixture 3 is fixed to the panel display 2 so that as the panel display 2 is opened or closed, the fixture 3 is rotated about the rotating shaft 5. In this case, the rotating shaft 5 is not rotatable but stationary. The term "shaft" not modified with either "rotating" or "stationary" used anywhere herein will refer to both the rotating and stationary shafts.

The rotating shaft 5 consists of, in addition to the mount plate portion 5a, a large-diameter portion 5b, small-diameter portion 5c. The small-diameter portion 5c further includes a portion 5d tapered away from the large-diameter portion 5b and having an external thread 5e formed thereon. The tapered portion 5d is formed to have a generally elliptic cross section. These portions are axially contiguous from one to another. The small-diameter portion 5c is inserted in the bearing hole 6 of the bearing plate portion 3b of the fixture 3 as previously mentioned. Besides the generally elliptic cross sectional shape of the tapered portion, the cross sectional shape may be a circular one, a generally D-like one obtainable by axially cutting one side of that portion any other suitable one.

The first friction washer 7 is disposed between the large-diameter portion 5b of the rotating shaft 5 and the bearing plate portion 3b of the fixture in engagement with one side of the bearing plate portion 3b. The first friction washer 7 is made of a material having a sufficient mechanical strength and abrasion resistance such as SUS (stainless steel) or phosphor bronze. The friction washer 7 has formed in the center thereof a hole 7a in which the small-diameter portion 5c of the rotating shaft 5 is inserted. The first friction washer 7 also has formed on the perimeter thereof an engagement tab 7b which is to be engaged in an engagement cut 3c formed in the perimeter of the bearing plate portion 3b of the fixture 3.

Also, there is provided between the first friction washer 7 and large-diameter portion 5b of the rotating shaft 5 the spring washer 8 having formed in the center thereof a hole 8a in which the small-diameter portion 5c of the rotating shaft 5 is inserted.

Further, the second friction washer 9 is disposed on the other side of the bearing plate portion 3b of the fixture 3. The second friction washer 9 is also made of a material having a sufficient mechanical strength and abrasion resistance such as SUS (stainless steel) or phosphor bronze. The second friction washer 9 has formed in the center thereof a hole 9a in which the small-diameter portion 5c of the rotating shaft 5 is inserted. The second friction washer 9 also has an engagement tab 9b formed on the perimeter thereof.

In addition, the lock washer 10 is disposed, in engagement, at the other side of the second friction washer 9. The lock washer 10 has formed in the center thereof a hole 10a having a generally elliptic cross section in which the noncircular tapered portion 5d of the small-diameter portion 5c of the rotating shaft 5 is force-fitted, and also it has formed in the perimeter thereof an engagement cut 10b in which the engagement tab 9b of the second friction washer 9 is to be engaged.

The first and second friction washers 7 and 9 have formed therein a plurality of grease traps 7c and 9c, respectively, communicating with their respective holes 7a and 9a. To maintain the smooth movement of the tilting hinge, a grease is filled in these traps 7c and 9c. Note that the grease traps 7c and 9c may be concavities or small holes formed in the surfaces of the first and second friction washers 7 and 9.

The locking nut 11 is disposed at the other side of the lock washer 10. The locking nut 11 is screwed on the externally threaded part 5e formed on the tapered part 5d of the small-diameter portion 5c of the rotating shaft 5. By turning the locking nut 11, the noncircular tapered part 5d is forced into the noncircular hole 10a of the lock washer 10 to press the second friction washer 9 to the spring washer 8 so that the first friction washer 7 is pressed to the spring washer 8, and the second friction washer 9 to the bearing plate portion 3b of the fixture 3. The locking nut 11 is provided with a detent.

Because of the construction of the friction mechanism 4, when the rotating shaft 5 or fixture 3 is rotated, a friction torque takes place between the first friction washer 7 and spring washer 8 as well as between the second friction washer 9 and bearing plate portion 3b of the fixture 3 with no rattling caused at the lock washer 10 when the rotating shaft 5 or fixture 3 is rotated.

Figure 4:
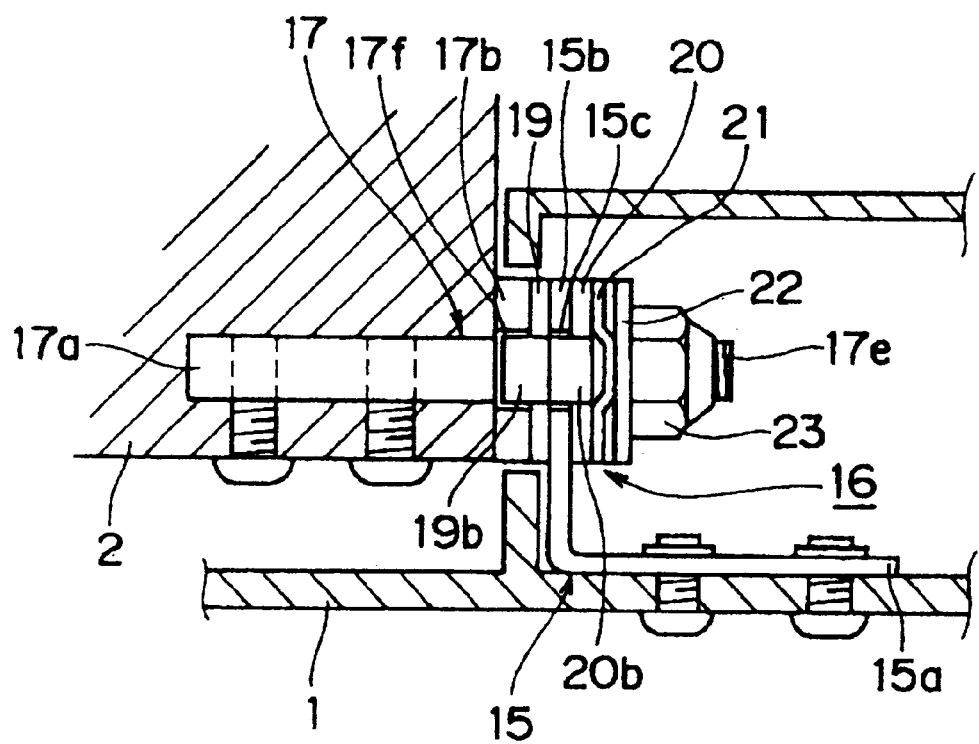
FIG. 4 is a partially sectional front view of a second embodiment of the tilting hinge according to the present invention.
Figure 5:
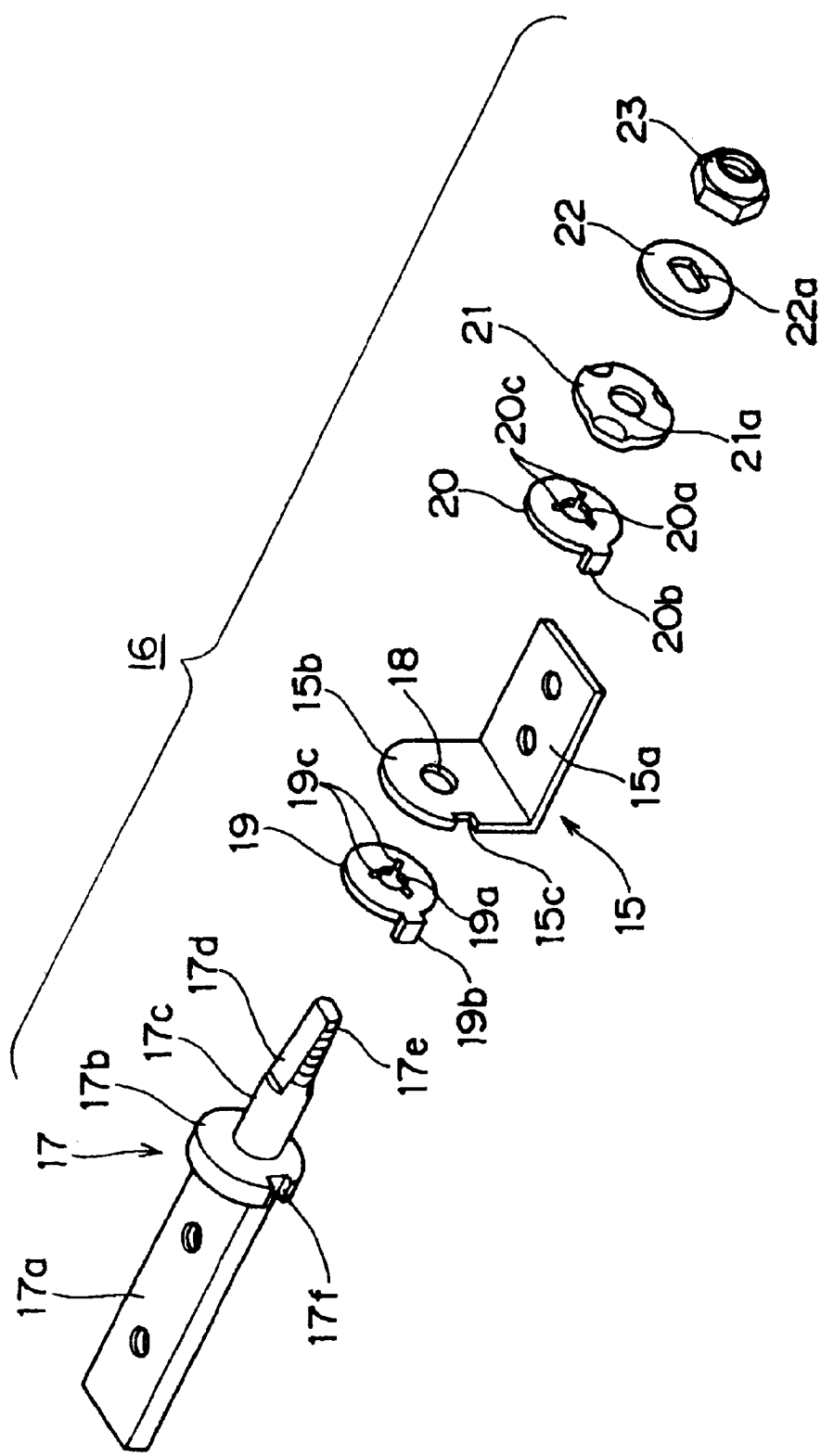
FIG. 5 is an exploded perspective view of the tilting hinge in FIG. 4.

FIG. 4 is a partially sectional front view of the second embodiment of the tilting hinge according to the present invention, showing the tilting hinge used in place, and FIG. 5 is an exploded perspective view of the tilting hinge in FIG. 4.

As best seen from FIG. 5, the second embodiment of the tilting hinge according to the present invention essentially comprises a friction mechanism 16 including a fixture 15, rotating shaft 17, first friction washer 19, second friction washer 20, spring washer 21, lock washer 22 and a locking nut 23.

The fixture 15 consists of a mount plate portion 15a and a bearing plate portion 15b bent at a right angle in relation to the mount plate portion 15a. The mount plate portion 15a is fixed to the main body 1 of the personal computer with screws. The bearing plate portion 15b has formed therein a hole 18 in which the rotating shaft 17 is supported rotatably. The rotating shaft 17 has a mount plate portion 17a which is fixed to the bottom end of the panel display 2. When the panel display 2 is opened or closed, the rotating shaft 17 is rotated correspondingly. At this time, the friction mechanism 16 will create a friction torque which allows to hold the panel display 2 at a desired opened angle. Of course, the rotating shaft 17 may be fixed to the main body 1 and the fixture 15 is fixed to the panel display 2 so that as the panel display 2 is opened or closed, the fixture 15 is rotated about the rotating shaft 17.

The rotating shaft 17 consists of, in addition to the mount plate portion 17a, a large-diameter portion 17b, small-diameter portion 17c. The small-diameter portion 17c further includes a flat portion 17d tapered away from the large-diameter portion 17b and having an external thread 17e formed thereon. The tapered portion 17d is formed to have a generally elliptic cross section. The small-diameter portion 17c is inserted in the bearing hole 18 of the bearing plate portion 15b of the fixture 15 as previously mentioned. The first friction washer 19 is disposed between the large-diameter portion 17b of the rotating shaft 17 and the bearing plate portion 15b of the fixture in engagement with one side of the bearing plate portion 15b. The first friction washer 19 is made of a material having a sufficient mechanical strength and abrasion resistance such as SUS (stainless steel) or phosphor bronze. The friction washer 19 has formed in the center thereof a hole 19a in which the small-diameter portion 17c of the rotating shaft 17 is inserted. The first friction washer 19 also has formed on the perimeter thereof an engagement tab 19b which is to be engaged in an engagement cut 17c formed in the perimeter of the large-diameter portion 17b of the rotating shaft 17.

Further, the second friction washer 20 is disposed on the other side of the bearing plate portion 15b of the fixture 15. The second friction washer 20 is also made of a material having a sufficient mechanical strength and abrasion resistance such as SUS (stainless steel) or phosphor bronze. The second friction washer 20 has formed in the center thereof a hole 20a in which the small-diameter portion 17c of the rotating shaft 17 is inserted. The second friction washer 20 also has formed on the perimeter thereof an engagement tab 20b which is to be engaged in an engagement cut 15c formed in the perimeter of the bearing plate portion 15b of the fixture 15. This engagement may be attained by forming on the bearing plate portion 15b of the fixture 15 an engagement projection on which the second friction washer 20 is engaged. The spring washer 21 has formed in the center thereof a hole 21a in which the small-diameter portion 17c of the rotating shaft 17 is inserted. The spring washer 21 is disposed in engagement with the other side of the second spring washer 20.

The first and second friction washers 19 and 20 have formed therein a plurality of grease traps 19c and 20c, respectively, communicating with their respective holes 19a and 20a. To maintain the smooth movement of the tilting hinge, a grease is filled in these traps 19c and 20c. Note that the grease traps 19c and 20c may be concavities or small holes formed in the surfaces of the first and second friction washers 19 and 20.

In addition, the lock washer 22 is disposed, in engagement, at the other side of the spring washer 21. The lock washer 22 has formed in the center thereof a hole 22a having a generally elliptic cross section in which the noncircular tapered portion 17d of the small-diameter portion 17c of the rotating shaft 17 is engaged. The locking nut 23 is disposed at the other side of the lock washer 22. The locking nut 23 is screwed on the externally threaded part 17e formed on the tapered part 17d of the small-diameter portion 17c of the rotating shaft 17.

Because of the construction of the friction mechanism 16, when the rotating shaft 17 or fixture 15 is rotated, a friction torque takes place between the spring washer 21 and second friction washer 20, between the first fiction washer 19 and the bearing plate portion 15b of the fixture 15, as well as between the second friction washer 20 and spring washer 21 with no rattling developed at the lock washer 22 and noncircular tapered portion 17d of the rotating shaft 17.

Figure 6:
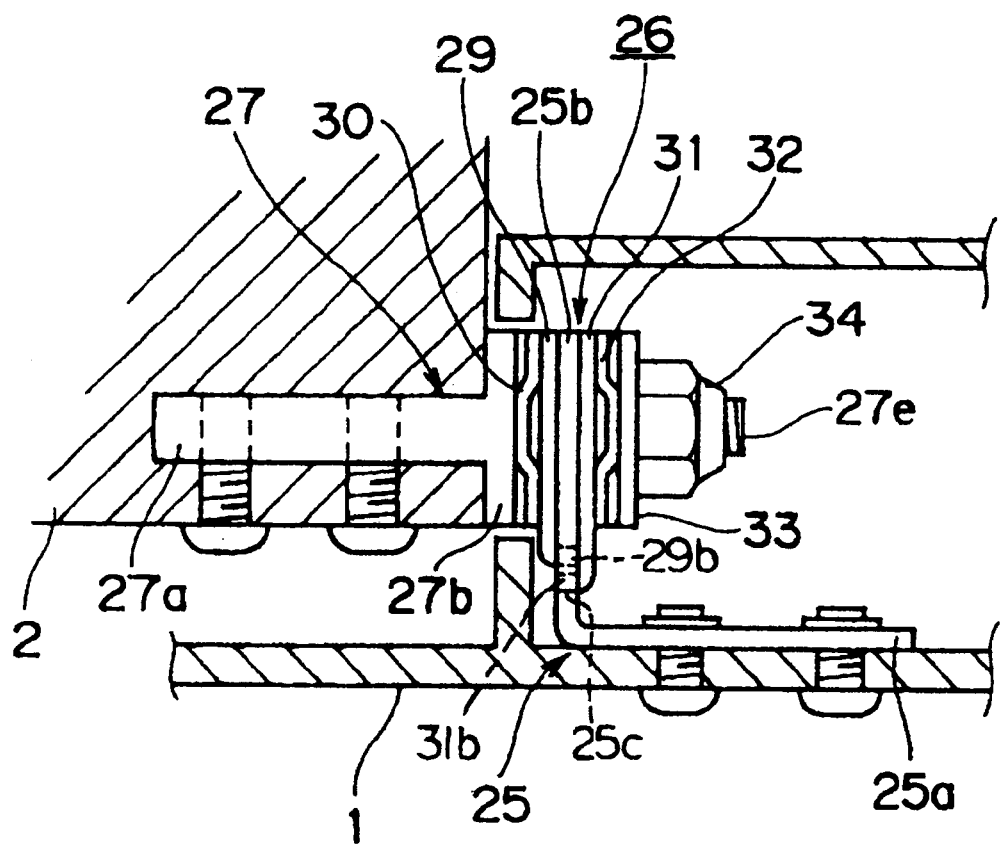
FIG. 6 is a partially sectional front view of a third embodiment of the tilting hinge according to the present invention.
Figure 7:
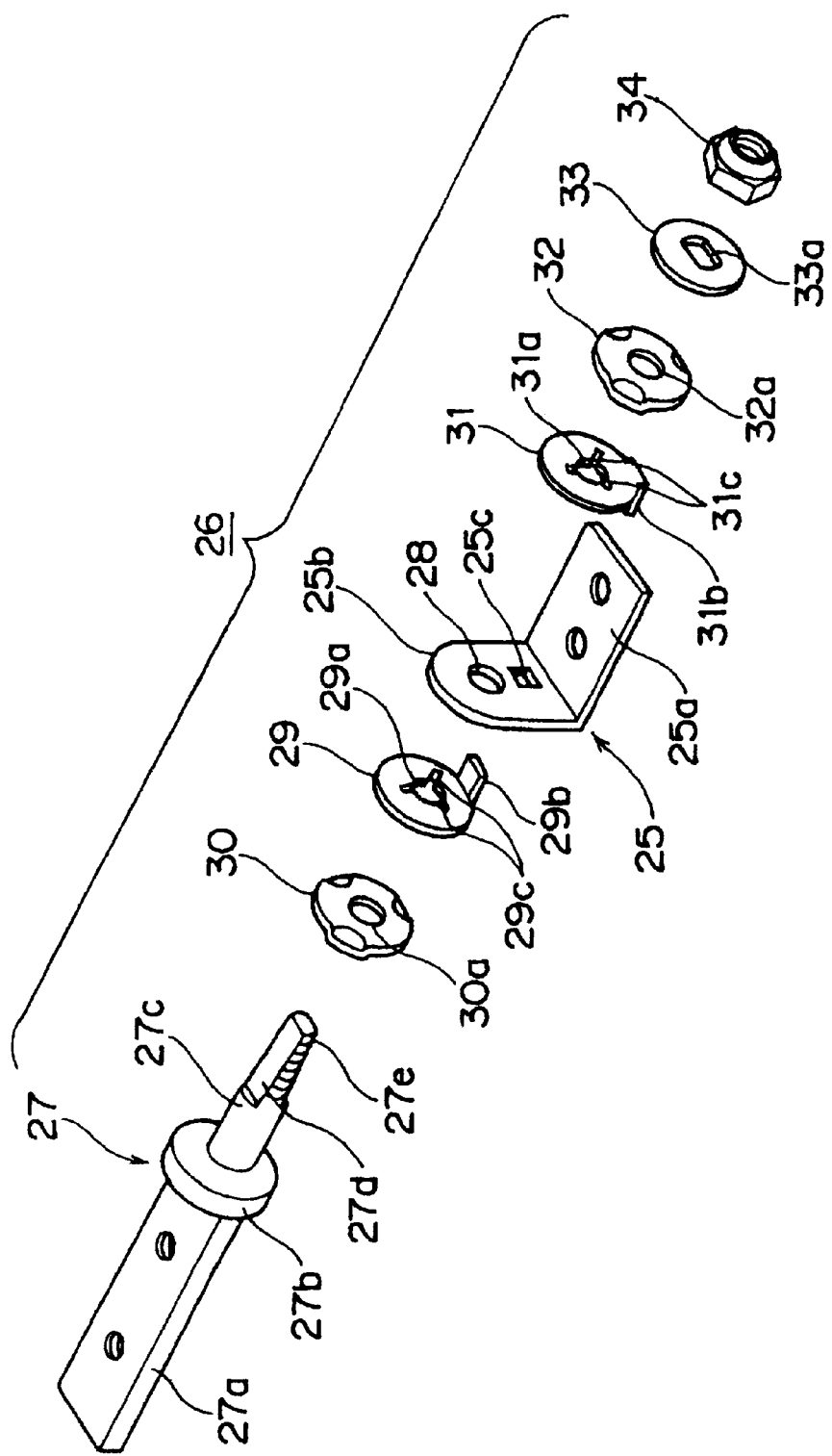
FIG. 7 is an exploded perspective view of the tilting hinge in FIG. 6.

FIG. 6 is a partially sectional front view of the third embodiment of the tilting hinge according to the present invention, showing the tilting hinge used in place, and FIG. 7 is an exploded perspective view of the tilting hinge in FIG. 6.

As best seen from FIG. 7, the third embodiment of the tilting hinge according to the present invention essentially comprises a friction mechanism 26 including a fixture 25, rotating shaft 27, first friction washer 29, first spring washer 30, second friction washer 31, second spring washer 32, lock washer 33 and a locking nut 34.

The fixture 25 consists of a mount plate portion 25a and a bearing plate portion 25b bent at a right angle in relation to the mount plate portion 25a. The mount plate portion 25a is fixed to the main body 1 of the personal computer with screws. The bearing plate portion 25b has formed therein a hole 28 in which the rotating shaft 27 is supported rotatably. The rotating shaft 27 has a mount plate portion 27a which is fixed to the bottom end of the panel display 2. When the panel display 2 is opened or closed, the rotating shaft 27 is rotated correspondingly. At this time, the friction mechanism 26 will create a friction torque which allows to hold the panel display 2 at a desired opened angle. Of course, the rotating shaft 27 may be fixed to the main body 1 and the fixture 25 is fixed to the panel display 2 so that as the panel display 2 is opened or closed, the fixture 25 is rotated about the rotating shaft 27. In this case, the rotating shaft 27 is not rotatable but stationary.

The rotating shaft 27 consists of, in addition to the mount plate portion 27a, a large-diameter portion 27b, small-diameter portion 27c. The small-diameter portion 27c further includes a flat portion 27d tapered away from the large-diameter portion 27b and having an external thread 27e formed thereon. The tapered portion 27d is formed to have a generally elliptic cross section. The small-diameter portion 27c is inserted in the bearing hole 28 of the bearing plate portion 25b of the fixture 25 as previously mentioned.

The first friction washer 29 is disposed between the large-diameter portion 27b of the rotating shaft 27 and the bearing plate portion 25b of the fixture in engagement with one side of the bearing plate portion 25b. The first friction washer 29 is made of a material having a sufficient mechanical strength and abrasion resistance such as SUS (stainless steel) or phosphor bronze. The friction washer 29 has formed in the center thereof a hole 29a in which the small-diameter portion 27c of the rotating shaft 27 is inserted. The first friction washer 29 also has formed on the perimeter thereof an engagement tab 29b which is to be engaged in an engagement hole 25c formed in the bearing plate portion 25b of the fixture 25.

Also, there is provided between the first friction washer 29 and large-diameter portion 27b of the rotating shaft 27 the first spring washer 30 having formed in the center thereof a hole 30a in which the small-diameter portion 27c of the rotating shaft 27 is inserted.

Further, the second friction washer 31 is disposed on the other side of the bearing plate portion 25b of the fixture 25. The second friction washer 31 is also made of a material having a sufficient mechanical strength and abrasion resistance such as SUS (stainless steel) or phosphor bronze. The second friction washer 31 has formed in the center thereof a hole 31a in which the small-diameter portion 27c of the rotating shaft 27 is inserted. The second friction washer 31 also has formed on the perimeter thereof an engagement projection 31b which is to be engaged in the engagement hole 25c formed in the bearing plate portion 25b of the rotating shaft 25. It should be noted that the engagement projection 31b may be engaged in any other engagement hole formed anywhere in the bearing plate portion 25b. For such engagement, there may be formed on the bearing plate portion 25b an engagement projection on which each of the friction washers may be engaged. Alternatively, this engagement projection may be engaged in the engagement hole in the bearing plate portion 25b. This is also true for the first friction washer 29.

In addition, the lock washer 33 is disposed, in engagement, at the other side of the second friction washer 31. The second spring washer 32 has formed in the center thereof a hole 32a having a generally elliptic cross section in which the noncircular tapered portion 27d of the small-diameter portion 27c of the rotating shaft 27 is inserted.

The first and second friction washers 29 and 31 have formed therein a plurality of grease traps 29c and 31c, respectively, communicating with their respective holes 29a and 31a. To maintain the smooth movement of the tilting hinge, a grease is filled in these traps 29c and 31c. Note that the grease traps 29c and 31c may be concavities or small holes formed in the surfaces of the first and second friction washers 29 and 31.

The lock washer 33 is disposed, in engagement, at the other side of the second spring washer 32. The lock washer 33 has formed in the center thereof a noncircular hole 33a in which the tapered portion 27d, having the noncircular cross section, of the rotating shaft 27 is to be inserted.

The locking nut 34 is disposed at the other side of the lock washer 33. The locking nut 34 is screwed on the externally threaded part 27e formed on the tapered part 27d of the small-diameter portion 27c of the rotating shaft 27.

With the locking nut 34 tightened, the washers are pressed in one direction and to each other, and the tapered portion 27d of the rotating shaft 27 is force-fitted and rigidly secured in the noncircular hole 33a of the lock washer 33.

Because of the construction of the friction mechanism 26, when the rotating shaft 27 or fixture 25 is rotated, a large friction torque takes place between the first friction washer 29 and first spring washer 30 as well as between the second friction washer 31 and second spring washer 32 with no rattling caused at the lock washer 33 when the rotating shaft 27 or fixture 25 is rotated.

In the embodiments of the present invention having been described in the foregoing, the means for engaging each friction washer on the shaft is not limited to the aforementioned ones. For this engagement, the small-diameter portion of the shaft may have an engagement recess formed therein while the friction washers may have formed therein holes having a form corresponding to the engagement recess in the small-diameter portion of the shaft. For engaging each friction washer to the bearing plate portion of the fixture, an engagement cut or recess may be formed on the perimeter of the friction washer instead of the engagement tab in the aforementioned embodiments while a corresponding engagement projection may be formed on the bearing plate portion of the fixture so that the projection on the bearing plate portion is engaged in the engagement cut in the friction washer. In effect, it suffices to engage or fix the friction washer on the bearing plate portion of the fixture. This is also true for engagement of each friction washer on the lock washer. Namely, it suffices to engage or fix the friction washer on the lock washer.

What is claimed is:

1. A tilting hinge, comprising;
   a bracket comprising a mount plate to be mounted on an apparatus body side and a bearing plate bent from the mount plate to be perpendicular to the mount plate and having a bearing hole;
   a rotating shaft rotatably supported in the bearing hole formed in the bearing plate of said bracket, said rotating shaft having a mounting portion to which an opening-closing body is attached, a large-diameter portion, and a small-diameter portion having an external thread portion, which are formed successively in the axial direction;

a first friction washer provided between said large-diameter portion of said rotating shaft and one side surface of the bearing plate of said bracket such that said small-diameter portion passes through a hole provided at a center portion of said first friction washer;

a second friction washer provided in contact with one side surface of the other side surface of the bearing plate of said bracket such that said small-diameter portion passes through a hole provided at a center portion of said second friction washer;

a spring washer provided in contact with said second friction washer such that said small-diameter portion passes through a hole provided at a center portion of said spring washer;

a lock washer provided in contact with the other side surface of said spring washer such that said small-diameter portion passes through a hole provided at a center portion of said lock washer and such that said lock washer rotates together with said small-diameter portion;

a locking nut screwed onto the external thread portion of said small-diameter portion in order to press said lock washer toward said spring washer;

a part of said small-diameter portion of said rotating shaft, along which it is inserted into said hole of said lock washer, being tapered and formed to have a noncircular cross section; and said noncircular tapered part tightly inserted into said hole in said lock washer being formed to have a noncircular shape corresponding to said noncircular tapered part of said small-diameter portion of said rotating shaft.

2. The tilting hinge as set forth in claim 1, including grease traps formed in one or both of the first and second friction washers.

3. The tilting hinge as set forth in claim 1, wherein the tapered part of the small-diameter portion of the rotating shaft is formed to have a generally D-like cross section obtainable by axially cutting one side of a round small-diameter portion, or a generally elliptic cross section obtainable by axially cutting both sides of a round small-diameter portion.

4. A tilting hinge, comprising;

a bracket comprising a mount plate to be mounted on an apparatus body side and a bearing plate bent from the mount plate to be perpendicular to the mount plate and having a bearing hole;

a rotating shaft rotatably supported in the bearing hole formed in the bearing plate of said bracket, said rotating shaft having a mounting portion to which an opening-closing body is attached, a large-diameter portion, and a small-diameter portion having an external thread portion, which are formed successively in the axial direction;

a spring washer provided in contact with said large-diameter portion of said rotating shaft such that said small-diameter portion passes through a hole provided at a center portion of said spring washer;

a first friction washer provided between said spring washer and one side surface of the bearing plate of said bracket such that said small-diameter portion passes through a hole provided at a center portion of said first friction washer, and such that said first friction washer engaged with said bearing plate;

a lock washer provided on said small-diameter portion such that said small-diameter portion passes through a hole provided at a center portion of said lock washer and such that said lock washer rotates together with said small-diameter portion;

a locking nut screwed onto the external thread portion of said small-diameter portion in order to press said lock washer toward said spring washer;

a second friction washer provided between the other side surface of the bearing plate of said bracket and said locking washer such that said small-diameter portion passes through a hole provided at a center portion of said second friction washer and such that said second friction washer rotates together with said lock washer;

a part of said small-diameter portion of said rotating shaft, along which it is inserted into said hole of said lock washer, being tapered and formed to have a noncircular cross section;

said noncircular tapered part tightly inserted into said hole of said lock washer being formed to have a noncircular shape corresponding to said noncircular tapered part of said small-diameter portion of said rotating shaft; and whereby when said rotating shaft is rotated a friction torque is generated between said first friction washer and said spring washer on said large-diameter portion of said rotating shaft and between said bearing plate and said second friction washer on the external thread of the rotating shaft.

5. The tilting hinge as set forth in claim 4, including grease traps formed in one or both of the first and second friction washers.

6. The tilting hinge as set forth in claim 4, wherein the tapered part of the small-diameter portion of the rotating shaft is formed to have a generally D-like cross section obtainable by axially cutting one side of a round small-diameter portion, or a generally elliptic cross section obtainable by axially cutting both sides of a round small-diameter portion.

7. A tilting hinge, comprising;

a bracket comprising a mount plate to be mounted on an apparatus body side and a bearing plate bent from the mount plate to be perpendicular to the mount plate and having a bearing hole;

a rotating shaft rotatably supported in the bearing hole formed in the bearing plate of said bracket, said rotating shaft having a mounting portion to which an opening-closing body is attached, a large-diameter portion, and a small-diameter portion having an external thread portion, which are formed successively in the axial direction;

a first friction washer provided between said large-diameter portion of said rotating shaft and one side surface of the bearing plate of said bracket such that said small-diameter portion passes through a hole provided at a center portion of said first friction washer and such that said first friction washer rotates together with said rotating shaft;

a second friction washer provided in contact with the other side surface of the bearing plate of said bracket such that said small-diameter portion passes through a hole provided at a center portion of said second friction washer and such that said second friction washer engaged with said bearing plate;

a spring washer provided in contact with said second friction washer such that said small-diameter portion passes through a hole provided at a center portion of said spring washer and such that said spring washer rotates together with said small-diameter portion;

a lock washer provided in contact with said spring washer such that said small-diameter portion passes through a hole provided at a center portion of said lock washer and such that said lock washer rotates together with said small-diameter portion;

a part of said small-diameter portion of said rotating shaft, along which it is inserted into said hole of said lock washer, being tapered and formed to have a noncircular cross section;

a locking nut screwed onto the external thread portion of said small-diameter portion in order to press said lock washer toward said spring washer;

said noncircular tapered part tightly inserted into said hole in said lock washer being formed to have a noncircular shape corresponding to said noncircular tapered part of said small-diameter portion of said rotating shaft; and whereby when said rotating shaft is rotated a friction torque is generated between said first friction washer and said bearing plate and between said second friction washer and said spring washer.

8. The tilting hinge as set forth in claim 7, including grease traps formed in one or both of the first and second friction washers.

9. The tilting hinge as set forth in claim 7, wherein the tapered part of the small-diameter portion of the rotating shaft is formed to have a generally D-like cross section obtainable by axially cutting one side of a round small-diameter portion, or a generally elliptic cross section obtainable by axially cutting both sides of a round small-diameter portion.

10. A tilting hinge, comprising;

a bracket comprising a mount plate to be mounted on an apparatus body side and a bearing plate bent from the mount plate to be perpendicular to the mount plate and having a bearing hole;

a rotating shaft rotatable supported in the bearing hole formed in the bearing plate of said bracket, said rotating shaft having a mounting portion to which an opening-closing body is attached, a large-diameter portion, and a small-diameter portion having an external thread portion, which are formed successively in the axial direction;

a first spring washer provided in contact with said large-diameter portion of said rotating shaft such that said small-diameter portion passes through a hole provided at a center portion of said spring washer;

a first friction washer provided between said spring washer and one side surface of the bearing plate of said bracket such that said small-diameter portion passes through a hole provided at a center portion of said first friction washer and such that said first friction washer engaged with said bearing plate;

a second friction washer provided in contact with the other side surface of the bearing plate of said bracket such that said small-diameter portion passes through a hole provided at a center portion of said second friction washer and such that said second friction washer engaged with said bearing plate;

a second spring washer provided in contact with said second friction washer such that said small-diameter portion passes through a hole provided at a center portion of said second spring washer and such that said spring washer rotates together with said small-diameter portion;

a lock washer provided in contact with said spring washer such that said small-diameter portion passes through a hole provided at a center portion of said lock washer and such that said lock washer rotates together with said small-diameter portion;

a part of said small-diameter portion of said rotating shaft, along which it is inserted into said hole of said lock washer, being tapered and formed to have a noncircular cross section; and said noncircular tapered part tightly inserted into said hole in said lock washer being formed to have a noncircular shape corresponding to said noncircular tapered part of said small-diameter portion of said rotating shaft;

a locking nut screwed onto the external thread portion of said small-diameter portion in order to press said lock washer toward said spring washer; and whereby when said rotating shaft is rotated, a friction torque is generated between said first friction washer and said first spring washer and between said second friction washer and said second spring washer.

11. The tilting hinge as set forth in claim 10, including grease traps formed in one or both of the first and second friction washers.

12. The tilting hinge as set forth in claim 10, wherein the tapered part of the small-diameter portion of the rotating shaft is formed to have a generally D-like cross section obtainable by axially cutting one side of a round small-diameter portion, or a generally elliptic cross section obtainable by axially cutting both sides of a round small-diameter portion.

\* \* \* \* \*